United States Patent [19]

Ogasawara

[11] Patent Number: 4,853,522

[45] Date of Patent: Aug. 1, 1989

[54] SYSTEM FOR PERMITTING ACCESS TO DATA FIELD AREA IN IC CARD FOR MULTIPLE SERVICES

[75] Inventor: Nobuo Ogasawara, Kawasaki, Japan

[73] Assignee: Fujitsu Limited, Kawasaki, Japan

[21] Appl. No.: 97,625

[22] Filed: Sep. 16, 1987

[30] Foreign Application Priority Data

Sep. 16, 1986 [JP] Japan ............................... 61-217722

[51] Int. Cl.⁴ ............................................. G06K 5/00
[52] U.S. Cl. .................................... 235/380; 235/492; 340/825.31
[58] Field of Search ............... 235/379, 380, 382, 492; 340/825.31, 825.33

[56] References Cited

U.S. PATENT DOCUMENTS 4,656,342 4/1987 Ugon ............................... 235/380 X
4,736,094 4/1988 Yoshida .............................. 235/379

OTHER PUBLICATIONS

ISO/TC86/SC6/WG7 (ISO No. Not Determined), Part 1 to Part 6.

Intamic; Contribution to ISO; GS/JB/85016; "Vocabulary for IC Cards"; Oct. 22, 1985; 8 pages.

Primary Examiner—David L. Trafton
Attorney, Agent, or Firm—Staas & Halsey

[57] ABSTRACT

A system for permitting access to a data field area in an IC card for multiple services using an individual card holder identification number for each of a plurality of data fields or for each group of data fields. Data field identification information, a personal identification number, access qualification information, and an authentication code are supplied to the IC card before an execution of an access to the data field. An authentication is made between the personal identification number and the authentication code stored in the IC card for the selected data field, and the personal identification number and the authentication code supplied to the IC card. Based on the result of the authentication, an access to the data field area to which access is requested is permitted within the limit of the access right stored in the IC card corresponding to the access qualification information supplied to the IC card.

8 Claims, 9 Drawing Sheets

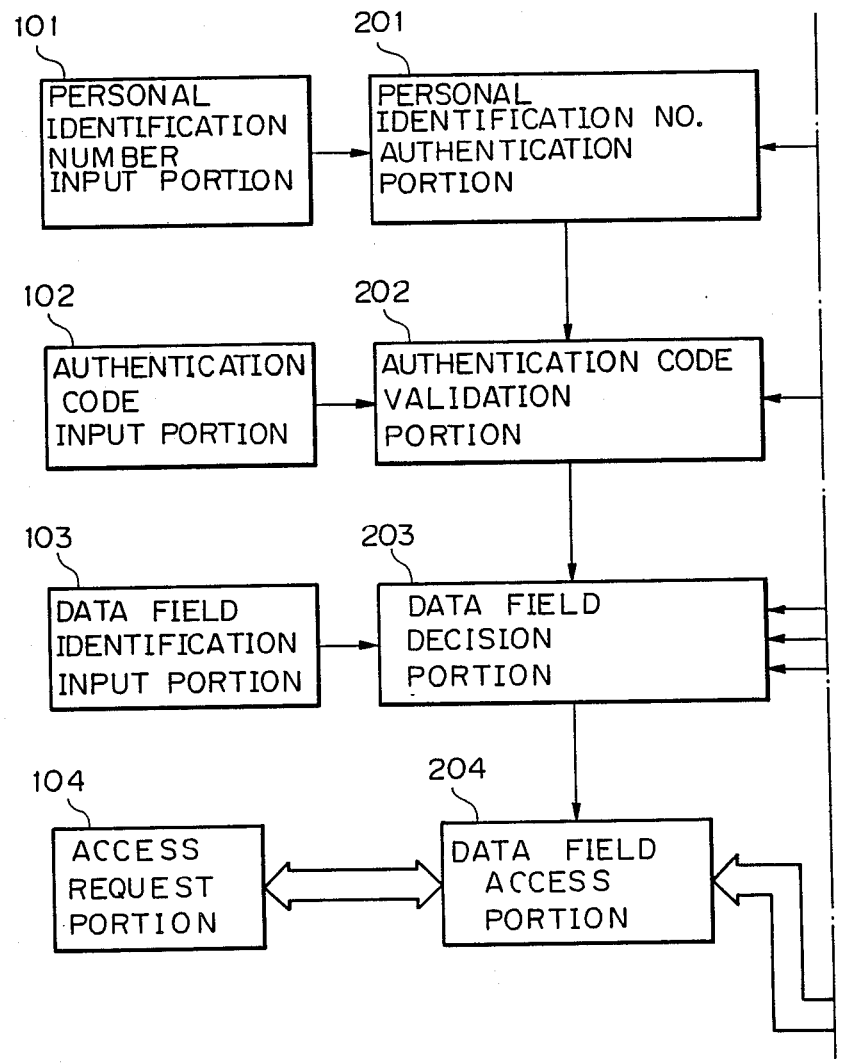

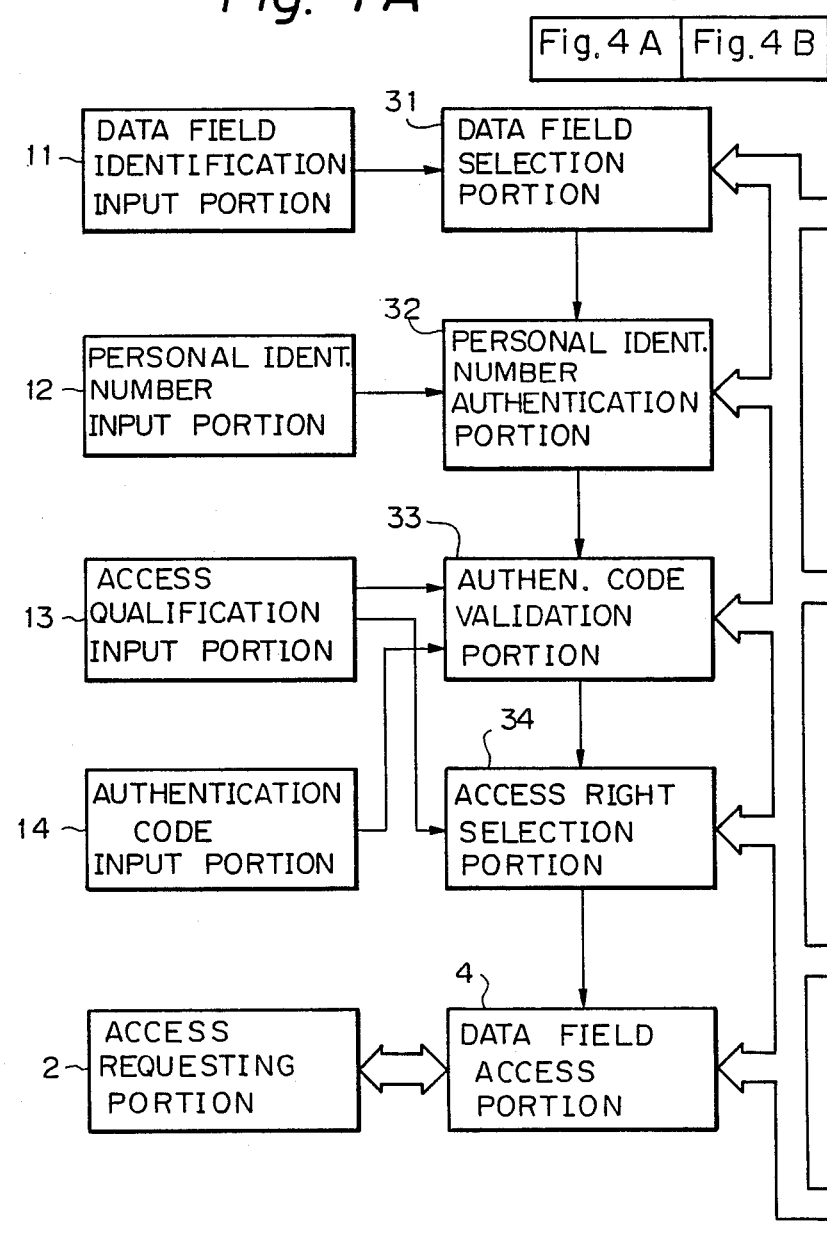

Fig. 5

| | AUTHENTICATION CODE | ACCESS RIGHT | | | |
|---|---|---|---|---|---|
| CARD ISSUER | X X X X X | R | W | D | RW |
| SERVICE SUPPLIER | Y Y Y Y Y | R | W | D | RW |
| CARD ACCEPTOR | Z Z Z Z Z | R | W | D | RW |
| CARD HOLDER | (PERSONAL IDENT. NUMBER) | R | W | D | RW |

R : READ
W : WRITE
D : DELETE
RW : REWRITE

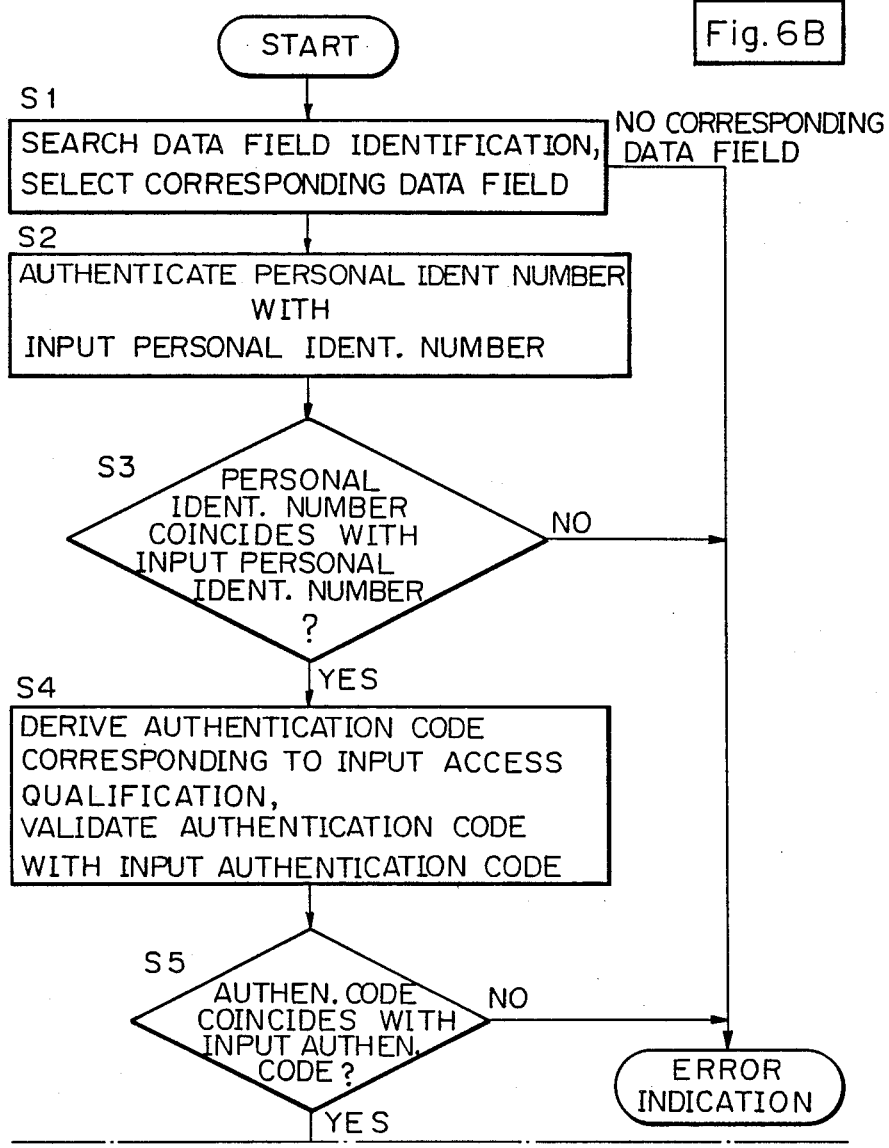

SYSTEM FOR PERMITTING ACCESS TO DATA FIELD AREA IN IC CARD FOR MULTIPLE SERVICES

BACKGROUND OF THE INVENTION

1. Field of the Invention

The present invention relates to a system for permitting access to a data field area in an integrated circuit card (IC card) for multiple services.

2. Description of the Related Art

In general, in the use of an IC card for multiple services, a card issuer, a service supplier, a card acceptor, and a card holder are involved. An IC card has a plurality of data fields for the multiple services, and for each of the data fields, the access right, access qualification, of card issuer, service supplier, card acceptor, and card holder should be predetermined. Namely, although a person has access right to a predetermined data field of an IC card, that person should not be authorized to have access to a data field of the IC card other than the predetermined data field.

It is desired that access is permitted only within the limit of the access right to a predetermined data field of a card holder, and access outside such limitation is not permitted, so that the data fields cannot be used in an unauthorized manner.

In the prior art, only a personal identification number (PIN) and an authentication code (AC code) for the whole of an IC card are provided for an IC card for multiple services, and therefore, once a coincident result is obtained as the result of an authentication of the personal identification number and the authentication code, access to all data fields in the IC card becomes possible.

As a result, it is possible for a person, for example, a card acceptor, who is not authorized to have access to the data field in question, will be able to obtain access to the data field in question. This constitute an unfair use of the IC card and a violation of the principle of secrecy of the IC card. Therefore, these problems of the prior art must be solved.

SUMMARY OF THE INVENTION

It is an object of the present invention to provide an improved system for permitting access to a data field area in an IC card for multiple services.

In accordance with the present invention, there is provided a system for permitting access to a data field area in an IC card for multiple services using an individual card holder identification number for each of a plurality of data fields or for each group of data fields, the system comprising: a plurality of data fields in the IC card; a sequence of a data field selection portion, a personal identification number authentication portion, an authentication code validation portion, and an access right selection portion, input portions for inputting data field identification information, a personal identification number, access qualification information, and an authentication code; a data field access portion and an access request portion; and storage portions for storing information for data field control. An authentication between the information stored in the storage portions and the information input through the input portions is carried out.

Based on the cumulative result of a selection of a data field, a authentication of the personal identification number, a validation of the authentication code, and a selection of the access right, access to a data field area to which access is requested is permitted within the limit of the selected access right.

BRIEF DESCRIPTION OF THE DRAWINGS

In the drawings,

FIGS. 3a and 3b are two parts of a prior art system for access to a data field area in an IC card for multiple services;

FIGS. 4a and 4b are two parts of a block diagram of a system for permitting access to a data field area in an IC card for multiple services according to an embodiment of the present invention;

FIG. 5 shows an example of combinations of the authentication code and the access right; and FIGS. 6a and 6b are two parts of a flow chart of the operation of the system of FIG. 4.

DESCRIPTION OF THE PREFERRED EMBODIMENTS

Before describing a preferred embodiment of the present invention, an IC card to which the system according to the present invention is applied, a fundamental combination of an IC card and a terminal apparatus, and a prior art system for access to a data field area in an IC card for multiple services will be explained with reference to FIGS. 1, 2, and 3.

Figure 1:
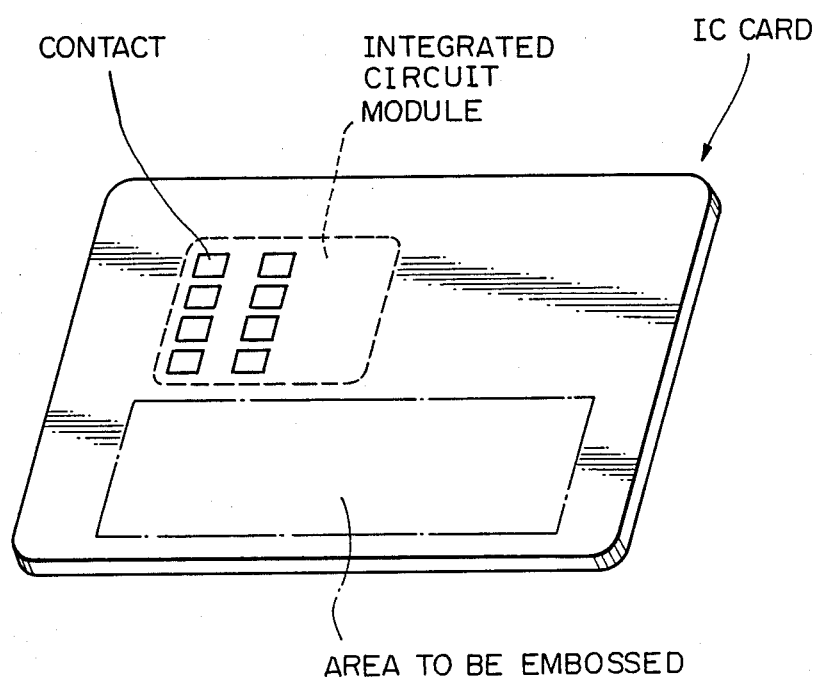
FIG. 1 is a perspective view of an IC card to which the system according to the present invention is applied.
Figure 2:
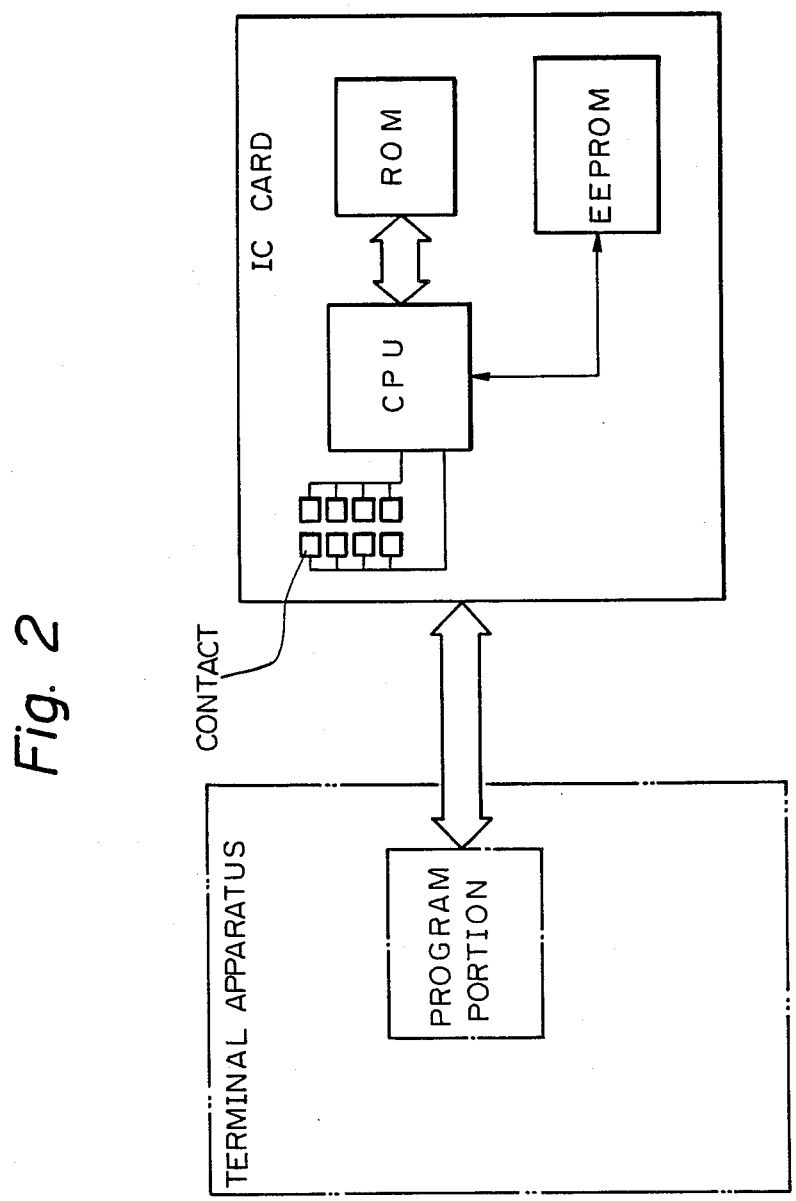
FIG. 2 shows a fundamental combination of an IC card and a terminal apparatus.

As shown in FIG. 1, an IC card has contacts adapted for electrical connection with external apparatuses, an integrated circuit module beneath the area containing the contact electrodes, and an area to be embossed. As shown in FIG. 2, the circuit of the IC card includes the contacts, a central processing unit (CPU), a read only memory (ROM) for storing a control program, and an electrically erasable and programmable read only memory (EEPROM) or an erasable and programmable read only memory (EPROM) for storing data fields, input information, and control information. The circuit of the IC card can communicate with the program portion in the terminal apparatus.

Figure 3B:
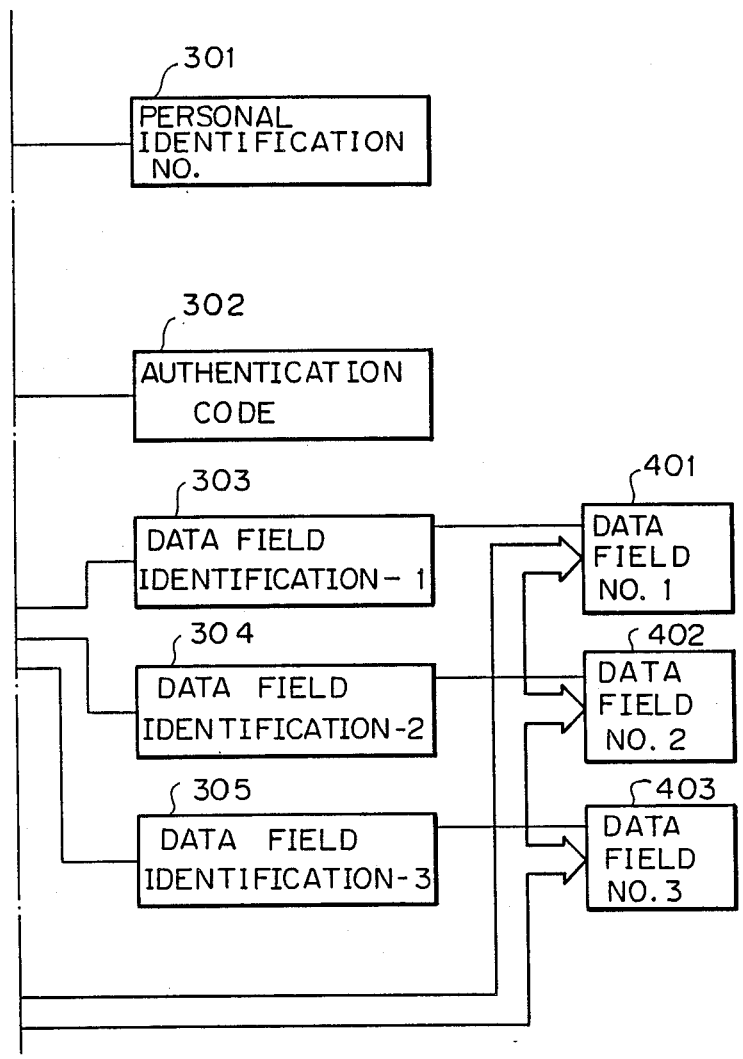

As shown in FIGS. 3a and 3b, in the prior art, the authentication between the input personal identification number 101 and the stored personal identification number 301 is carried out in the personal identification number authentication portion 201. Based on the coincident result of this authentication, the validation between the input authentication code 102 and the stored authentication 302 is carried out in the authentication code validation portion 202, and based on the result of this validation, the decision obtained from the stored information 303, 304, and 305 for data field identification No. 1, No. 2, and No. 3 corresponding to the data fields No. 1, No. 2 and No. 3 is carried out in the data field decision portion 203 with respect to the input data field identification information 103.

Once one of the data fields No. 1, No. 2, and No. 3 is chosen according to the decision of one of the data field identification No. 1, No. 2, and No. 3, access through the access request portion 104 is permitted to the chosen data field.

Figure 4B:
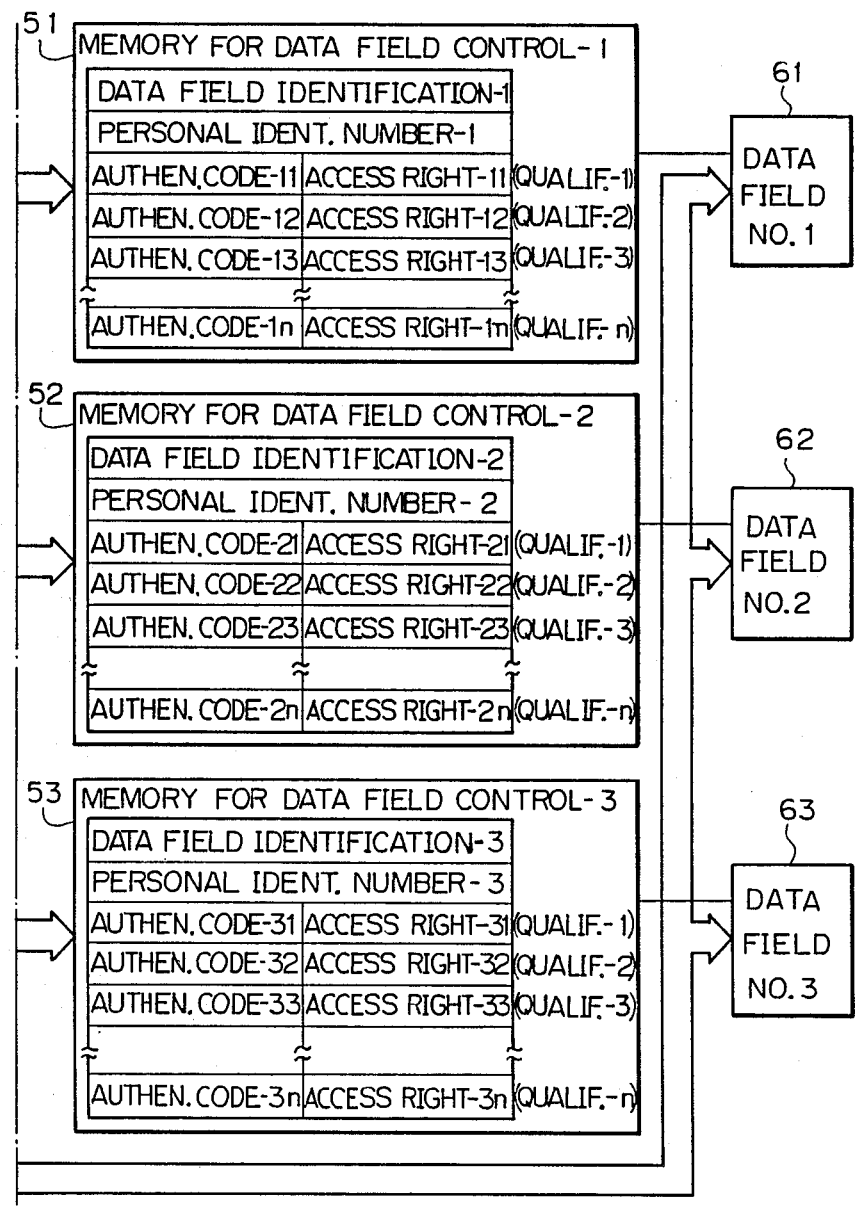

A system for permitting access to a data field area in an IC card for multiple services according to an embodiment of the present invention is shown in FIGS. 4a and 4b. The system of FIGS. 4a and 4b includes a data field input portion 11, a personal identification number input portion 12, an access qualification input portion 13, an authentication code input portion 14, an access request portion 2, a data field selection portion 31, a personal identification number authentication portion 32, an authentication code validation portion 33, an access right selection portion 34, and a data field access portion 4.

The system of FIGS. 4a and 4b also includes a data field (No. 1) 61, a data field (No. 2) 62, a data field (No. 3) 63, a memory for data field control (No. 1) 51, a memory for data field control (No. 2) 52, and a memory for data field control (No. 3) 53. The memories 51, 52, and 53 corresponding to the data fields No. 1, No. 2, and No. 3, respectively.

For example, information for the data field identification No. 1, personal identification number (No. 1), authentication code Nos. 11, 12, 13 ... 1n, and information for the access right Nos. 11, 12, 13 ... 1n are stored in the memory 51. The authentication code No. 11 and the information for the access right No. 11 comprises an access qualification No. 1, the authentication code No. 12, and the information for the access right No. 12 comprises an access qualification No. 2, and so on. The authentication code No. 1n and the information for the access right No. 1n comprises an access qualification No. n.

Here, the information for the access right concerns which one of the processes of reading, writing, deleting, and re-writing should be permitted.

In the data field selection portion 31, a comparison between the input data field identification 11 and the data field identification stored in the memories 51, 52, and 53 is carried out, so that one of the data field Nos. 1, 2, and 3 is selected according to the coincident result of that comparison.

In the personal identification authentication portion 32, after the above-mentioned selection of the data field, the authentication between the input personal identification number and the personal identification number stored in the memory corresponding to the selected data field is carried out so that it can be confirmed whether or not the person inputting the personal identification number is the person authorized to use the data field in question.

In the authentication code validation portion 33, after an affirmative confirmation of the personal identification, a validation concerning the input authentication code and the authentication code stored in the memory corresponding to the selected data field and the input access qualification is carried out so that it can be confirmed whether or not the access executor has the proper authentication code.

In the access right selection portion 34, after an affirmative confirmation of the authentication code, an extraction of the access right information stored in the memory corresponding to the selected data field and input access qualification information is carried out so that the access right permitted to the access executor is selected.

In the data field access portion 4, after the selection of the access right, the access to the selected data field is carried out corresponding to the permitted access right in response to the input access request through the access request portion 2.

An example of the combinations of the authentication codes and the access rights is shown in FIG. 5.

Figure 6B:
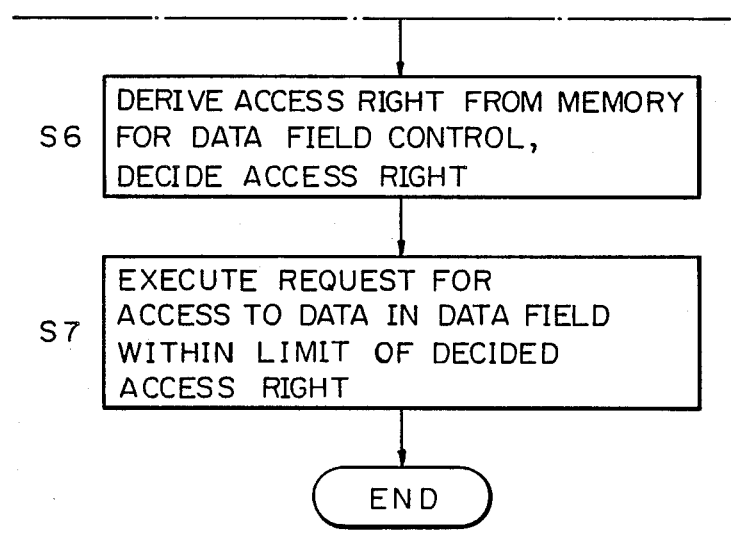

The operation of the system of FIGS. 4a and 4b will be described below with reference to the flow chart of FIGS. 6a and 6b.

Upon input of an access start request, a data field identification, a personal identification number, access qualification information, and an authentication code, the data field identifications stored in the memory are searched and the data field corresponding to the input data field identification is selected (step S1). When there is no corresponding data field, the process proceeds to the error indication.

When the data field in question is selected, the process proceeds to step S2, where the personal identification number stored in the memory for the selected data field is authenticated with regard to the input personal identification number. When the stored personal identification number does not coincide with the input personal identification number, the process proceeds to the error indication.

When the stored personal identification number coincides with the input personal identification number, the process proceeds to step S4 where the authentication code corresponding to the input access qualification information is derived, and the validation concerning the derived authentication code and the input authentication code is carried out. When the derived authentication code does not coincide with the input authentication code, the process proceeds to the error indication.

When the derived authentication code coincides with the input authentication code, the process proceeds to step S6, where the access right corresponding to the input access qualification information is derived from the memory for data field control and the decision for access right is made.

Then, in step S7, the request for access to data in the selected data field is executed within the range of the above-described access right.

I claim:

1. A system for permitting access by a card acceptor to a data field area in an IC card for multiple services of multiple service suppliers using an individual card holder identification number for each of a plurality of data fields or for each groups of data fields, said system comprising:

a plurality of data fields in the IC card, each corresponding to a different service;

a sequence of data field selection means, a personal identification number authentication means, an authentication code validation means, and an access right selection means;

card acceptor input means for inputting data field identification information, a personal identification number, access qualification information, and an authentication code;

a data field access means and access request means; and storage means for storing information for data field control;

comparisons between the information stored in said storage means and the information input through said input means being carried out, for authentication, validation, and selection; and based on the cumulative result of a selection of a data field, an authentication of a personal identification number, an authentication of a personal identification number, a validation of an authentication code, and a selection of an access right, access to a data field area to which access is requested is permitted within a limit of the selected access right.

2. A system according to claim 1, wherein each memory for data field control stores data field identification information, a personal identification number, a plurality of authentication codes, and a plurality of access rights information.

3. A system according to claim 1, wherein the access qualification information input by said input means is an information for selecting an authentication code and an access right.

4. A system according to claim 1, wherein the access right information stored in the memories for data field control selected by the access qualification information is represented by one of the processes of reading, writing, deleting, and re-writing.

5. A system according to claim 1, wherein said personal identification number authentication means is operated based on signals from the data field selection means, the personal identification number input means, and the memories for data field control.

6. A system according to claim 1, wherein said authentication code validation means is operated based on signals from the personal identification number authentication means, the access qualification input means, the authentication code input means, and the memories for data field control.

7. A system according to claim 1, wherein said access right selection means is operated based on signals from the authentication code validation means, the access qualification input means, and the memories for data field control.

8. A system for permitting access to a data field area in an IC card for multiple services using an individual card holder identification number for each of a plurality of data fields, said system comprising:
- a plurality of data fields in the IC card, each corresponding to a different service;
- a plurality of memories correspondingly coupled to each of the data fields and including at least data field identification information, a personal identification number, and a plurality of access qualifications, each formed by a paired authentication code number and access right information;
- data field selection means coupled to the plurality of memories and plurality of data fields;
- personal identification number authentication means coupled to the plurality of memories and plurality of data fields;
- authentication code validation means coupled to the plurality of memories and plurality of data fields;
- access right selection means coupled to the plurality of memories and plurality of data fields;
- data field access means coupled to the plurality of data fields and the plurality of memories;
- means for inputting data field identification information to the data field selection means;
- means for inputting a personal identification number to the personal identification number authentication means;
- means for inputting access qualification information to the authentication code validation means and to the access right selection means;
- means for inputting an authentication code to the authentication code validation means;
- means for inputting an access request to the data field access means;
- the data field selection means, the personal identification number authentication means, the authentication code validation means and the access right selection means being operable to sequentially select a data field based on a match between stored and input data field identification information, authenticate a personal identification number based on a match between stored and input personal identification numbers, derive a stored authentication code number corresponding to the input access qualification information, validate the derived authentication code by matching with the input authentication code, derive an access right corresponding to the input access qualification information, and access a requested data field through the data field access means based on the derived access right.

* * * * *